Sept. 10, 1957      A. PECHUKAS      2,805,956
SILICA PIGMENT AND METHOD OF PREPARING SAME Filed May 28, 1952      2 Sheets-Sheet 1

INVENTOR.
ALPHONSE PECHUKAS
BY
*Oscar L. Spencer*
ATTORNEY

United States Patent Office 2,805,956
Patented Sept. 10, 1957

2,805,956

SILICA PIGMENT AND METHOD OF PREPARING SAME

Alphonse Pechukas, Pittsfield, Mass., assignor to Columbia-Southern Chemical Corporation, Allegheny County, Pa., a corporation of Delaware Application May 28, 1952, Serial No. 290,536

9 Claims. (Cl. 106—288)

This invention reltaes to a novel method of preparing a silica pigment and to the novel silica pigment thereby produced. Prior to the present invention it was known that a silica pigment suitable for reinforcing rubber and for other purposes could be prepared by reaction of an acid or acidic reacting material with a metal silicate, such as alkali metal silicates and alkaline earth metal silicates. The preparation of such pigments must be performed under special conditions of operation. Typical methods by which such pigments can be prepared have been described in the following copending applications for United States Letters Patent:

| Applicant | Ser. No. | Date Filed |
|---|---|---|
| E. M. Allen | 63, 205 | December 2, 1948, now abandoned. |
| Do | 194, 945 | November 9, 1950, now abandoned. |
| Do | 204, 493 | January 4, 1951, now abandoned. |
| F. S. Thornhill | 227, 284 | May 19, 1951. |

Pigments produced according to the processes disclosed in the above identified applications are in the form of finely divided essentially amorphous porous hydrated silica flocs which contain in excess of 80 percent and usually above 90 percent by weight of $SiO_2$, measured on the anhydrous basis (that is, on a basis excluding free and bound water) "bound" water in the proportion of one mole thereof per 3 to 9 moles of $SiO_2$ and free water in an amount of about 2 to 10 percent by weight. The surface area of this silica is 60 to 200 square meters per gram, preferably in the range of 75 to 175 square meters per gram, and its average ultimate particle size is below 0.1 micron, usually in the range of 0.015 to 0.05 micron. In general, the product contains less than 1.75 percent, preferably less than 1 percent, of $Na_2O$, but may contain up to about 10 percent by weight of an alkaline earth metal or zinc or aluminum (computed as the oxide thereof). Such metal appears in the pigment as an oxide which possibly is in chemical association with the silica and usually is present in the proportion of about 10 to 150 moles of $SiO_2$ per mole of metal oxide.

Figure 1:
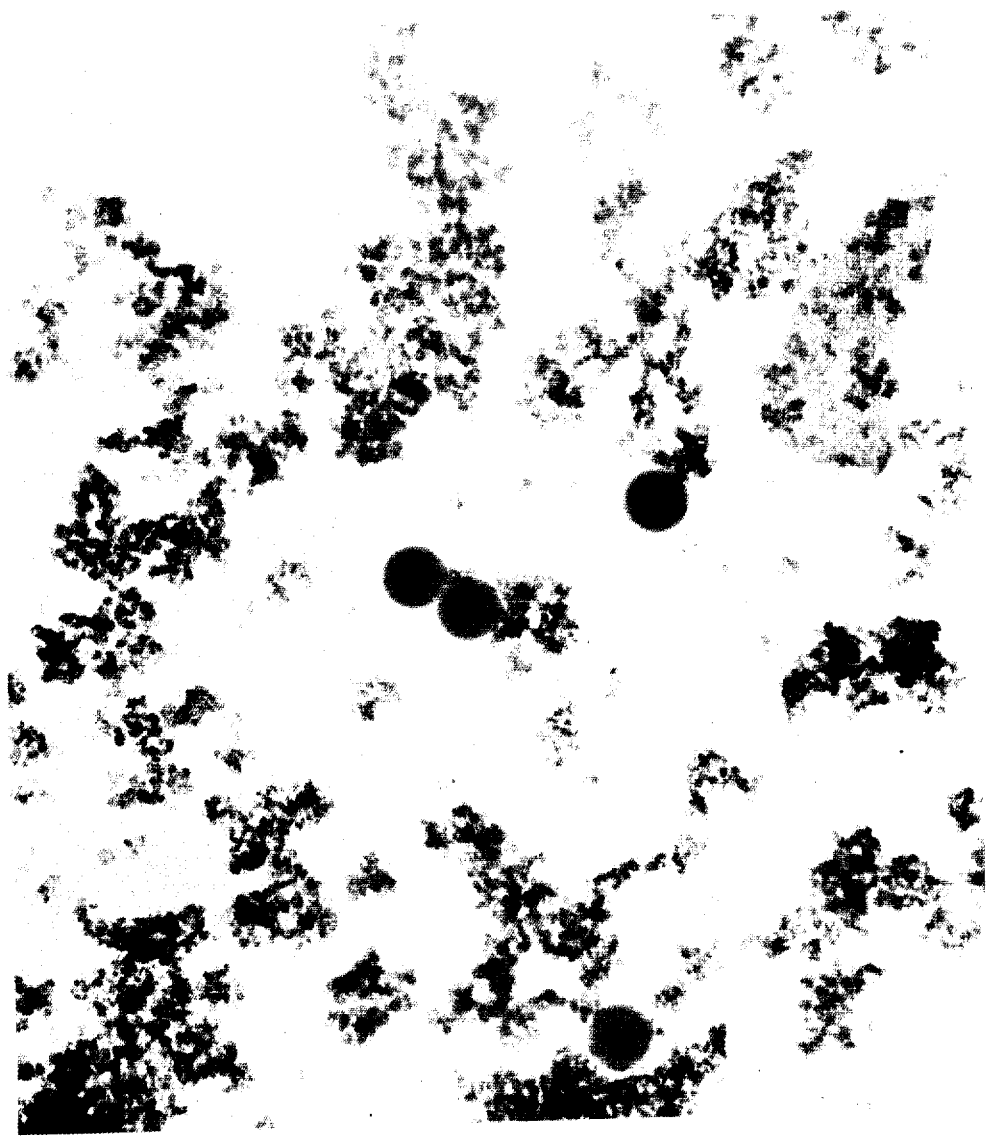

An electron photomicrograph of this hydrated silica is shown in Fig. 1. The photograph was prepared from an alcohol-water suspension of the silica. The large ball appearing in the photomicrograph is a polystyrene latex particle known to have a diameter of about 2600 angstrom units. As shown, the silica is in the form of loosely linked aggregates of smaller particles resembling a bunch of grapes. The average ultimate particle size of this product is about 0.015–0.05 micron.

Two types of water are present in the pigment herein contemplated. These types are termed "bound water" and "free water." The term "free water," as used herein, is intended to denote the water which may be removed from the silica pigment by heating the pigment at a temperature of 105° C. for a period of 24 hours in a laboratory oven. The term "bound water," as used herein, is intended to mean the amount of water which is driven off from a silica pigment by heating the pigment at ignition temperature, for example, 1000 to 1200° C. until no further water can be removed, minus the amount of free water in the pigment. This bound water appears to be chemically combined with the pigment. For this reason, the bound water does not come off readily unless dried at temperatures above 400° C. On the other hand, the free water comes off readily upon drying at normal or slightly elevated temperatures. Some portion of this water will be picked up on standing in atmospheric air of normal humidification. When bound water is removed, however, only a small portion thereof is reabsorbed.

According to the present invention, a further novel pigment has been prepared. This pigment has a reduced water content and when incorporated in rubber compositions yields products of higher abrasive resistance. This pigment may be prepared by heating the pigments produced according to the above described processes to effect a controlled removal of water therefrom while controlling conditions of heating so as to prevent excessive crystal formation.

For a full understanding of the invention and to make clear the type of pigment which is subjected to treatment according to my invention to produce my novel pigment, it is advantageous to discuss in some detail some of the processes of the above identified applications.

Silica to be treated according to this invention may be prepared by a large number of methods. A particularly effective method of preparing the silica pigment herein contemplated involves reaction of finely divided alkaline earth metal silicate, such as calcium silicate, having an average ultimate particle size below 0.1 micron, with an acid having an anion which forms a water soluble salt with the alkaline earth metal.

In the practice of this process, the acid is reacted with the calcium silicate in an aqueous medium, and sufficient acid is added to largely decompose the calcium silicate and to extract the calcium therefrom, and to prevent establishment of a concentration of calcium in the silica above about 6 percent by weight of the silica pigment, computed as CaO. Consequently, sufficient acid is used to reduce the pH below about 7, usually in the range of 3 to 5. During the acidification, the slurry of calcium silicate may be agitated in order to promote and facilitate reaction. In order to avoid use of excess acid, acid is added in small portions until the desired pH has been reached, as indicated, for example, by suitable indicators, such as methyl orange. In general, additions of large excesses of acid beyond a pH of 0, for example, are unnecessary. After the reaction of calcium silicate with acid has been completed and the pH of the aqueous slurry has been reduced below about 4 or 5, the precipitated silica is recovered.

This silica, of course, is present in an aqueous slurry. Serious problems arise in the recovery of the silica from the slurry by virtue of the fact that the silica fails to settle rapidly and also filters with extreme slowness. What is even more important, the finely divided pigment thus obtained normally has a surface area well above 200 square meters per gram.

It has been found that these difficulties may be avoided by readjusting the pH of the slurry above 5, usually above 6 and generally in the range of 7 to 8.5, rarely in excess of 10. This adjustment is advantageous in order to facilitate separation of the silica from the aqueous medium. It is also advantageous since it effects a material reduction in the surface area of the pigment produced and thereby insures that this pigment will have the surface area desired.

Following this, the pigment is recovered by settling and/or filtration. Thereafter, the pigment is dried.

In general, the alkali is added to the precipitated silica before the silica is completely separated from the mother liquor which contains dissolved calcium chloride or like calcium salt. Thus, the process normally is conducted by adding acid to a slurry or suspension of the calcium silicate until the pH thereof is reduced to 5 or below, and thereafter alkali, such as sodium hydroxide or like alkali metal hydroxide, is added to the resultant slurry. As a consequence of this, the silica obtained contains an appreciable amount, usually 1 to 5 percent by weight of CaO.

In order to obtain a product which has maximum pigmentary reinforcing characteristics when used in rubber compositions, it is necessary to use a special form of calcium silicate or similar alkaline earth metal silicate. That is, some calcium silicates will not produce the results desired. In general, in order to obtain a proper pigment from calcium silicate, it is necessary to use a precipitated calcium silicate having a surface area of 50 to 125 square meters per gram and an average ultimate particle size below 0.1 micron, usually 0.02 to 0.06 micron.

The manner in which the calcium silicate has been prepared has a definite influence upon the character of the silica which is obtained therefrom. Thus, it has been found that tensile tests of rubber compositions containing silica obtained from calcium silicate prepared by reaction of calcium acetate with sodium silicate were lower than those prepared as hereinafter described, either because they cured with extreme slowness or for other reason.

The best silica which has been prepared from calcium silicate has been obtained when the calcium silicate has been prepared by reacting calcium chloride with alkali metal silicate in aqueous medium containing sodium chloride or like alkali metal chloride. This sodium chloride conveniently may be in the calcium chloride solution although it may also be in the sodium silicate solution. Thus, it is found most desirable to react aqueous sodium silicate with an aqueous calcium chloride solution containing sodium chloride preferably in the proportion of at least 0.1 pound, and usually in the range of 0.2 to 0.5 pound, of sodium chloride per pound of calcium chloride. Normally, the NaCl content of the solution should be in excess of 2 to 5 grams per liter. Solutions which contain higher sodium chloride content may be used. However, it is rare that the weight of sodium chloride will exceed the weight of calcium chloride in the solution or will be present in excess of 100 grams per liter in either solution. The presence of the sodium chloride materially improves the character of the pigment.

The concentrations of the calcium chloride solution and the alkali metal silicate solution also have a bearing upon the final product. Thus, using a solution in which the sodium chloride content was 0.3 to 0.4 pound per pound of calcium chloride, pigments of inferior quality were obtained when the calcium chloride concentration was 5 or 10 grams per liter. Best pigments were obtained in such a case when the calcium chloride solution contained at least 20 grams per liter, usually in the range of 50 to 150 grams per liter, and using sodium silicate solution containing in excess of 20 grams of $SiO_2$ per liter, usually in the range of 50 to 150 grams per liter of $SiO_2$. More concentrated solutions, containing up to about 200 grams per liter of $CaCl_2$ and $SiO_2$ or even higher, may be used although best results have been obtained when the concentration of the $CaCl_2$ and $SiO_2$ solutions is below 200 grams per liter.

The proportion of calcium chloride solution to sodium silicate normally is sufficient to react with all or at least most of the sodium silicate. In general, the amount of calcium chloride is in stoichiometric excess. However, small excesses of sodium silicate are not objectionable. Thus, it is possible to use sodium silicate 10 to 25 percent in excess of the calcium chloride although best results are obtained when the calcium chloride is at least in stoichiometric amount. Excesses of sodium silicate as high as 100 percent over stoichiometric usually give unsatisfactory products. However, even such amounts may be used if the sodium chloride concentration is sufficiently high and the rate of acidification is held within the proper limits. Thus, the adverse effects of excess sodium silicate may be counteracted to an appreciable degree by the presence of sodium chloride in the reaction mixture subjected to acidification.

The precipitation of calcium or other alkaline earth metal silicate in finely divided state, such as is herein required, may be accomplished with best results by mixing a stream of aqueous sodium silicate solution with a stream of calcium chloride solution under conditions which subject the mixture to a high degree of turbulence and almost instantaneous mixing. The amount of reactants in the respective streams is proportioned so as to obtain calcium silicate in the desired concentration and to establish an excess of calcium chloride over the stoichiometric quantity required to react with the silicate. One effective way to produce the required turbulence is to introduce two streams closely together into a central area of a centrifugal pump. In this case, the agitation of the mixture is effected as the introduced streams of the reactants are thrown radially outward by the pump rotor. In most cases, it is found desirable to limit the feed of the calcium chloride solution and alkaline metal silicate solutions to the pump to an amount below the capacity of the pump. For example, if the pump is capable of discharging 100 gallons per minute with unlimited flow of liquid to the pump, the amount of reacting solution supplied to the pump is held at least 10 percent below, and usually 35 percent or more below this amount. This appears to afford a greater degree of agitation of the reacting solutions and to ensure production of calcium silicate having the desired fineness.

To ensure production of the calcium silicate in a highly finely divided state, alkaline metal silicate having the composition $Na_2O(SiO_2)_x$, where $x$ is a number not less than 2 nor more than 4, is preferably used. This results in the production of a calcium silicate having the composition $CaO(SiO_2)_x$, where $x$ is as defined above. However, other calcium silicates, wherein $x$ is higher or lower, may be used in certain cases.

The resulting silica is a dry powder which is found to be in an extremely fine state of division and is preponderantly silica. By analysis, the dried product normally contains above 75 percent $SiO_2$, the usual range being about 78–88 percent $SiO_2$.

On the anhydrous basis, the silica concentration of the product is above 90 percent, usually being in excess of about 95 percent. The surface area of this product ranges between 75 and 125 square meters per gram as measured by the Brunauer-Emett-Teller method of determining surface area.

The pigment usually contains approximately 10 to 15 percent water. The free water content normally ranges between 2 to 10 percent, the balance being bound water.

The pigment prepared according to this method normally contains an appreciable concentration of calcium. This calcium content usually ranges between ½ to 6 percent, computed as calcium oxide. Because of this calcium content, the pH of the pigment is stabilized on the alkaline side. Other impurities, frequently in the range of 0.1 to 2 percent, such as iron and aluminum oxides, sodium chloride, and carbon dioxide, usually are present.

The following are typical analyses of silica samples made from various runs in which calcium silicate prepared as described above is reacted with hydrochloric acid as above described:

TABLE I

| Sample No. | Percent SiO₂ | Percent R₂O₃ (Aluminum and iron oxide) | Percent CaO | Percent Cl | Percent H₂O |
|---|---|---|---|---|---|
| 1 | 82.3 | 1.30 | 1.40 | 0.21 | 15 |
| 2 | 86.5 | 0.73 | 1.18 | | 11.6 |
| 3 | 79.77 | 1.16 | 2.54 | 0.89 | 15.6 |
| 4 | 79.9 | 2.2 | 3.0 | 0.37 | 14.5 |
| 5 | 83.99 | 0.80 | 1.31 | 0.47 | 14.4 |

Percentages in the above table are by weight.

The acid used to effect the neutralization or decomposition of calcium silicate normally is hydrochloric acid. On the other hand, other acids which form water soluble anions with calcium may be used. Such acids include hypochlorous acid, hydrobromic acid, nitric acid, nitrous acid, and acetic acid. The following is an example of this process:

EXAMPLE I

Streams of aqueous sodium silicate solution containing 100 grams per liter of $SiO_2$ as $Na_2O(SiO_2)_{3.36}$, and calcium chloride solution containing 100 grams per liter of $CaCl_2$ and 30 to 40 grams per liter of sodium chloride were fed directly into the central area of a centrifugal pump at 150° F. The rates of flow were adjusted so that calcium chloride was approximately 10 percent in excess over the stoichiometric quantity required for reaction, and so that the amount of liquid supplied to the pump was about 25 percent below the output capacity of the pump. In consequence, the solutions were subjected to turbulent intermixing in the pump.

The slurry of calcium silicate thus produced was introduced into a tank and sufficient hydrochloric acid solution containing 28 percent by weight of HCl was added, with stirring, to reduce the pH of the slurry to 2. Thereupon, sufficient sodium hydroxide solution containing 40 percent by weight of NaOH was added to raise the pH of the slurry to 7.5. The precipitated silica was recovered by decantation and filtration, and was dried in an oven at a drying temperature of 120–140° C. for 12 hours. The free water content of the product was within the range of 3 to 8 percent by weight of the pigment.

It will be noted that the silica pigments may be prepared from materials other than calcium silicate. Thus, finely divided precipitated magnesium silicate, barium silicate or strontium silicate, as well as silicates of zinc and other metals of series 3 to 8, group II of the periodic table, which have the surface area properties roughly approximating those set forth with respect to calcium silicate, may be subjected to treatment with water soluble acids according to this invention, in order to extract the metals and produce the herein contemplated pigment. In such a case, the magnesium or like silicate preferably is produced as described above by reaction of the metal chloride solution containing 0.1 pound of NaCl per pound of metal chloride.

The surface area of the resulting silica is determined by the pH of the slurry from which it is recovered. Thus, if sufficient acid is added to the calcium silicate to reduce the pH to as low as 2, for example, the silica which is thus obtained has an unusually high surface area. On the other hand, when this slurry is treated with alkali to increase the pH to above 5, the surface area reduces as the pH increases, so that when the pH is 5 or above, the surface area has fallen to approximately 135.

The following example illustrates this principle:

EXAMPLE II

Eight liters of calcium silicate slurry containing 100 grams per liter of calcium silicate, and prepared according to the method described in Example I, was placed in a 12-liter flask fitted with a stirrer. The slurry was heated to 70° C. while being stirred, and then hydrochloric acid solution having a strength of 3.5 normal was added at a rate of 100 milliliters per minute for 12½ minutes. Fifteen minutes after all the acid was added, 3.5 normal sodium hydroxide solution was added to the slurry, with agitation, at a rate of 100 milliliters per minute for 11 minutes. During the addition of the hydrochloric acid and the sodium hydroxide, 100 milliliters of samples of slurry were withdrawn at the time intervals indicated in the table below, and placed in 4-ounce sample bottles which were then closed. These samples were allowed to stand for 3 days. Thereafter, the pH of the slurry samples was measured and the slurries filtered on a 100-milliliter Buchner funnel. The time was noted when the filter cake lost its shine prior to cracking. This time interval was taken as the filtration time.

Following filtration of the slurry, the filter cake was washed with distilled water until free of chloride ions. The washed pigment samples were then dried in an oven at 105° C., ground in a mortar, and the surface area of the samples was measured.

The results obtained are summarized in the following table:

TABLE II

*Acidification and causticization of calcium silicate slurry*

| Time, Minutes | Slurry pH | Filtration time (Minutes and Seconds) | Surface Area of product (Square meters per gram) |
|---|---|---|---|
| 0 | 9.14 | 2' 23" | 93.4 |
| 1 | 8.98 | 2' 53" | 92.7 |
| 2 | 8.93 | 2' 30" | 96.0 |
| 4 | 8.83 | 2' 28" | 99.3 |
| 6 | 8.72 | 2' 28" | 105.5 |
| 8 | 8.56 | 3' 4" | 113.7 |
| 8.5 | 8.51 | 3' 35" | 119.8 |
| 9 | 8.46 | 2' 41" | 123.2 |
| 9.5 | 8.35 | 2' 48" | 124.4 |
| 10 | 8.20 | 2' 53" | 133.2 |
| 10.5 | 8.10 | 3' 23" | 132.5 |
| 11 | 7.80 | 2' 54" | 130.5 |
| 11.5 | 7.33 | 2' 52" | 135.5 |
| 12 | 6.68 | 3' 30" | 165.0 |
| 12.5 | 2.41 | 12' 35" | 506 |

15 MINUTES ELAPSED TIME

| | | | |
|---|---|---|---|
| 0 | 2.30 | 8' 0" | 507 |
| .5 | 7.00 | 2' 51" | 138.2 |
| 1 | 7.57 | 3' 23" | 130.4 |
| 1.5 | 7.91 | 3' 31" | 123.7 |
| 2 | 8.15 | 3' 18" | 126.2 |
| 2.5 | 8.29 | 3' 4" | 120.0 |
| 3 | 8.47 | 2' 55" | 120.7 |
| 3.5 | 8.58 | 2' 50" | 110.6 |
| 4 | 8.76 | 2' 52" | 105.2 |
| 4.5 | 8.88 | 2' 40" | 99.6 |
| 5 | 8.97 | 2' 26" | 99.7 |
| 6 | 9.09 | 2' 21" | 116.7 |
| 8 | 9.14 | 2' 5" | 138.2 |
| 10 | 9.22 | 1' 52" | 186.3 |
| 11 | 9.28 | 52" | 208.5 |

In the above tests, it will be noted that the pH of the slurry and not of the dried pigment was obtained. In general, it is found that when the dried pigment is slurried in water, the pH thereof is somewhat higher than that of the initial slurry. With slurries having a pH above about 8, this difference is only minor. On the other hand, with slurries having a pH below 8, the pH of the dry pigment, when reslurried, usually is as much as 1 or 2 pH units above that of the pH of the initial slurry.

The above tests clearly indicate the effect of the pH upon the filtering characteristics and also the surface area of the ultimate product. Thus, it is usually desirable to effect the reaction under conditions such that the pH of the slurry prior to filtration is in excess of 5 and, preferably, the pH should be so adjusted that the dry pigment has a pH above 7.

The pigments contemplated within the scope of the present invention may be prepared by other methods. For example, the calcium silicate prepared as described above, and/or having the properties described above, may be reacted with an aqueous solution of ammonium chloride. In such a case, the ammonium chloride reacts with the calcium silicate, liberating ammonia and precipitating silica. This process may be practiced according to the methods which have been described in copending application Serial No. 204,493, filed January 4, 1951. As described in such application, the reaction proceeds according to the following equation:

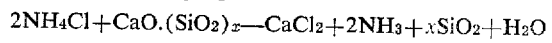

The reaction of calcium silicate with ammonium chloride may be effected by adding the ammonium chloride, usually as an aqueous solution, to an aqueous slurry of the calcium silicate. During this addition, the slurry is generally agitated and, ultimately, the slurry is heated to drive off the ammonia. Usually, this heating is continued until all or substantially all of the free ammonia has been driven off. Sufficient ammonium chloride is used to ensure decomposition of substantially all of the calcium silicate.

Advantageously, the ammonium chloride solution should contain an appreciable amount of ammonia and sodium chloride. Silica which has especially valuable properties has been prepared using such a solution. The amount of ammonia and sodium chloride which may be present is capable of considerable variation. Solutions containing in excess of 5, and usually ranging from 5 to 50 grams per liter of free ammonia, are found to be suitable. The sodium chloride content of solutions used according to this invention normally exceeds 25 grams per liter of solution, usually being in the range of 50 to 100 grams of NaCl per liter of solution.

After reaction of the calcium silicate with the ammonium chloride is completed and the resulting free ammonia has been removed, the resulting slurry is treated to recover the pigment suspended therein. This may be done effectively by conventional decantation and/or filtration operations. In the course of this operation, water soluble salts, such as calcium chloride, ammonium chloride, etc., are washed from the pigment and the resulting product is dried at a suitable temperature.

Some improvement in pigment properties of silica produced by reaction of calcium silicate with ammonium chloride is obtained when the resulting silica is subjected to the reaction of acid after removal of ammonia is essentially complete. These acids should be capable of forming water soluble compounds with calcium. Typical acids suitable for use are hydrochloric, nitric, acetic, and like acids. Such treatment removes a portion or all of residual calcium, magnesium, iron, aluminum, and other impurities, and thus ensures production of a purer product. Following this acid treatment, it frequently will be advantageous to neutralize excess acidity and to ensure production of a pigment having a pH above 6 or 7. The following examples are illustrative:

EXAMPLE III

An aqueous solution of sodium silicate was prepared by diluting 5.88 liters of sodium silicate containing 298 grams per liter of $SiO_2$ as sodium silicate having the composition $Na_2O(SiO_2)_{3.36}$, with sufficient water to produce 20.7 gallons of solution. A further solution was made by dissolving 1220 grams of calcium chloride and 320 grams of sodium chloride in 16.0 gallons of water. Streams of these aqueous solutions were fed directly into the central area of a centrifugal pump, proportioning the rates of flow so that calcium chloride remained in excess over the stoichiometric quantity required for reaction with the sodium silicate at all times. After mixing of the two solutions was complete, 475 grams of ammonium chloride was added to the resulting calcium silicate slurry and the slurry was thereafter boiled for about 4 hours, at which time the odor of ammonia was very faint. Thereafter, the slurry was washed and filtered, and was dried at a temperature of about 120° C. A white friable product having the following composition was produced:

| | Percent by weight |
|---|---|
| Ignition loss | 13.67 |
| $SiO_2$ | 77.84 |
| $R_2O_3$ (iron and aluminum) | 1.30 |
| CaO | 5.88 |
| MgO | 1.36 |

EXAMPLE IV 47.1 liters of sodium silicate solution containing 298 grams per liter of $SiO_2$ as $Na_2O.(SiO_2)_{3.36}$ was diluted to 145 gallons. 87.5 gallons of an aqueous solution containing 10,650 grams of calcium chloride and 2,800 grams of sodium chloride was made up. These solutions were mixed with vigorous agitation as in Example III. The slurry precipitate was washed to remove dissolved chlorides, and an aqueous slurry containing 42.7 grams of calcium silicate per liter of slurry was obtained. Fifty gallons of this calcium silicate slurry was mixed with 23.19 liters of aqueous ammonium chloride solution containing 160 grams per liter of $NH_4Cl$ and about 20 grams per liter of free ammonia, together with about 70 grams per liter of NaCl.

The resulting mixture was heated to boiling until no further ammonia was given off. Thereafter, the precipitate was filtered, washed, dried, and pulverized. The resulting product is preponderantly $SiO_2$.

EXAMPLE V

Calcium silicate slurry was prepared according to the process generally described in Example I, using an aqueous solution of sodium silicate containing 100 grams per liter of $SiO_2$ as $Na_2O(SiO_2)_{3.36}$, and calcium chloride solution containing 100 grams per liter of $CaCl_2$ and 30 to 40 grams per liter of NaCl at a temperature of 150° F. The resulting slurry of calcium silicate contained 0.35 gram equivalents per liter of alkalinity as determined by titration with HCl to methyl orange end point.

One hundred gallons of this calcium silicate slurry was placed in a tank and mixed with 20 gallons of ammonium chloride solution containing 1.95 grams equivalents of $NH_4Cl$ per liter of solution as well as 15 grams per liter of free ammonia and 70 grams per liter of NaCl.

The resulting slurry was heated by passing the slurry in countercurrent contact with steam in a 6-inch glass-lined steel column packed to a depth of 18 feet with ½ inch Berl saddles. In this operation, the slurry was fed to the top of the column at a rate of 10 gallons per hour, and substantially saturated steam fed to the bottom of the column at a rate of 50 pounds per hour, ammonia being withdrawn from the top of the column. The resulting slurry had a pH of 7.6.

After filtration and drying at a temperature of about 100 to 120° C., the product had the following composition:

| | Percent by weight |
|---|---|
| Chloride | 0.47 |
| Free $H_2O$ | 10.45 |
| Ignition loss | 12.49 |
| CaO | 1.85 |
| $SiO_2$ | Balance |
| pH | 8.2 |

This product is an effective rubber reinforcing pigment.

EXAMPLE VI

Twelve gallons of silica slurry prepared as described in Example V, after the steam treatment, was mixed with 200 cubic centimeters of an aqueous solution of hydrochloric acid containing 32 percent by weight of HCl.

The resulting mixture was allowed to digest at a temperature of 30° C. for 16 hours. Thereafter, the slurry was filtered and the resulting silica dried. This product, when incorporated in rubber, according to standard methods, yielded results which were superior to those obtained using silica prepared according to Example V.

It will also be understood that hydrated silica pigments may be prepared by other processes. For example, silica can be precipitated by reaction of ammonium chloride with sodium silicate under specific conditions which are controlled and adjusted so as to produce a pigment of the character herein contemplated. Moreover, sodium silicate may be reacted with acids, notably carbonic acid, in order to produce a pigment of the type herein contemplated.

Hydrated silica pigments to be treated according to this invention may be prepared by direct precipitation of silica from sodium silicate. In such a case, they must be prepared carefully in order to avoid gel formation. The precipitation must be effected by adding an acid or acid anhydride, such as carbon dioxide, to an aqueous solution of alkali metal silicate under carefully correlated conditions. Thus, the rate of acid introduction must be adjusted in accordance with the $SiO_2$ concentration, the NaCl concentration, and the temperature of the alkali metal silicate solution. Generally, the silicate solution should contain 10 to 100 grams per liter of $SiO_2$ as $Na_2O(SiO_2)_x$, where $x$ is 2 to 4, and the temperature should be 15 to 100° C. The rate of acid addition to any such solution at a given temperature will depend upon the NaCl content thereof.

Inorganic acids may be used for this purpose. Such acids include the acid anhydride, carbon dioxide, or sulphur dioxide as well as hydrochloric acid, hypochlorous acid, nitric acid, sulphuric acid, sulphurous acid, phosphoric and phosphorous acids, and acid salts, such as sodium bicarbonate and the like.

Moreover, certain so-called neutral salts, notably ammonium chloride, may be used.

The following examples are illustrative:

EXAMPLE VII

A 30-gallon, open-top barrel, provided with an agitator consisting of a vertical shaft driven by a ¼ H. P. motor and having three 3-inch propellers, was charged with 48 liters of an aqueous solution of sodium silicate, $Na_2O(SiO_2)_{3.36}$, containing 20.3 grams per liter of $Na_2O$, about 68 grams per liter of $SiO_2$, and 10 grams per liter of sodium chloride. Carbon dioxide gas, diluted with air to such an extent that the diluted gas had a $CO_2$ concentration of about 10 percent by volume, was introduced into the drum through a stainless steel tube with the discharge end of the tube being located below the bottom of the agitator. The rate of introduction of gas was adjusted so that just the theoretical amount of carbon dioxide was introduced into the solution in 24 hours, required to produce sodium carbonate. This carbonation rate was held substantially constant over the carbonation period. The temperature was maintained at 35° C. during carbonation and the mixture continuously agitated.

After the theoretical amount of carbon dioxide had been introduced, the mixture was heated by direct introduction of steam from a 140-pound steam line to maintain the temperature of the slurry at boiling temperature for a period of about 2 hours. The heated slurry was then filtered and the dewatered silica dried in an oven at a temperature of 108° C., after which it was micro-pulverized.

The surface area of the resulting finely divided silica was determined by the standard low temperature, nitrogen adsorption method proposed by Brunauer, Emmett, and Teller, and was found to be 149 square meters per gram.

In the preparation of the pigment under the above conditions, the presence of the soluble salt is important. Silica formed under the same conditions but with smaller amounts of sodium chloride was inferior as a rubber pigment, and when the sodium chloride was omitted, the precipitated silica gelled and was discarded.

The term "theoretical amount" is used to designate the calculated amount of carbon dioxide required to convert the sodium of the sodium silicate into sodium carbonate.

EXAMPLE VIII

The procedure of Example VII was followed except that the filtered silica pigment was washed with hydrochloric acid before drying, and then washed free of chloride ions with water. The acid treated pigment was dried and micro-pulverized as in Example VII. The measured surface area (B. E. T. method) of the resulting pigment was 461 square meters per gram. The bound sodium present in the sample was 0.02 percent.

EXAMPLE IX

A 90-liter autoclave kettle provided with a heating and cooling coil, an agitator, and a metal thermometer, was charged with 48 liters of a solution containing 20 grams per liter of sodium chloride and a quantity of sodium silicate sufficient to cause the solution to contain 20.3 grams per liter of $Na_2O$ and about 68 grams per liter of $SiO_2$. Essentially pure carbon dioxide was introduced through the bottom of the kettle under the liquid level of the solution at a point about 1 inch below the center of the agitator. The temperature was maintained at 25° C. during carbonation.

The carbon dioxide was fed to the solution at such a rate as to deliver the theoretical amount of carbon dioxide thereto in 4 hours and carbonation was continued at this rate for an additional hour, thus providing a 25 percent excess of $CO_2$ over that theoretically required to produce the carbonate.

After 5 hours of carbonation, a sample of the slurry (designated sample A in the table below) was taken out, the pigment filtered, washed twice with water, re-slurried, and the pH of the slurry adjusted to 7.3 with hydrochloric acid. Thereafter, the pigment was washed until the filtrate was substantially chloride-free.

The slurry remaining in the kettle was boiled for 1 hour and two samples of the boiled slurry removed from the kettle. One of these samples (designated sample B in the table below) was washed with water alone while the other (sample C) was re-slurried and the pH of the slurry adjusted to 7.2 with hydrochloric acid. The acidified pigment was then washed substantially chloride-free with water.

The slurry remaining in the kettle was maintained under a carbon dioxide atmosphere with agitation for an additional 2 hours. The carbon dioxide pressure was maintained from about 2 to 5 pounds per square inch gauge. This treatment of the slurry with carbon dioxide under pressure reduced the pH of the slurry somewhat. A sample of the thus treated slurry (sample D) was recovered by filtration and washed with tap water.

All of samples A to D were dried at 105° C. in a forced draft, laboratory oven, and were micro-pulverized. Their surface areas were as follows:

| Sample No. | Surface Area (Square meters per gram) |
| --- | --- |
| A | 337 |
| B | 122 |
| C | 138 |
| D | 127 |

EXAMPLE X

A 90-liter autoclave kettle provided with a heating and cooling coil, an agitator, and a metal thermometer, was charged with 12,850 grams of sodium silicate solution containing 976 grams of Na₂O and 3115 grams of SiO₂. The solution was diluted to 48 liters total volume, and the temperature raised to 95° C. The solution was carbonated with 100 percent CO₂ and a carbonation rate was used such as to introduce the theoretical amount of CO₂ in about 30 minutes. Carbonation was continued at this rate for about 1 hour, at the end of which time the pH of the slurry was 9.85.

The resulting slurry was filtered and washed twice with hot tap water. The filter cake was re-slurried and adjusted to a pH of 6.75 by adding 400 cubic centimeters of 3.5 N HCl thereto. The acidified slurry was then filtered and the filter cake washed nearly chloride-free with hot tap water, after which the precipitate was dried at 105° C. in a forced draft laboratory oven, then micro-pulverized, air-conditioned, analyzed, and compounded in rubber as previously described. The finished pigment had a pH of 8.2 and contained 0.61 percent sodium. Its B. E. T. surface area was 148 square meters per gram.

The present invention is directed to a novel method of improving the pigments described above and to the novel composition produced thereby. Rubber compositions reinforced with these pigments have definitely superior abrasion resistance and higher modulus characteristics than rubber compositions containing silica of the type described above.

This improved pigment contains silica and bound water in relative amounts corresponding to the formula:

$$H_2O \cdot (SiO_2)_x$$

where $x$ is a number (including both whole and fractional numbers) between 14 and 85. This pigment may be prepared by heating or calcining any of the above described hydrated precipitated silica pigments at a temperature above about 350° C. but below that at which substantial crystalline silica is formed (usually not above 800 to 900° C. and frequently much lower) and interrupting the heating before appreciable (more than about 2 to 5 percent) of the silica is converted to crystalline silica, as determined by X-ray diffraction.

The permissible temperature range and time of heating are affected by impurities in the pigment treated which, in turn are determined by the process of precipitating the pigment. For example, silica prepared by precipitation from alkali metal silicate solution, as described in the aforesaid application of Thornhill, becomes excessively crystalline when calcined at a temperature of 800° C. in a muffle furnace for 16 hours. Hence, calcining such pigment under such condition should not exceed 700° C. and usually should be in the range of 375 to 700° C.

On the other hand, higher temperatures may be applied without excessive crystal formation when the silica undergoing calcination has been prepared by reaction of calcium silicate or like silicate of an alkaline earth metal, etc., according to the methods described in the aforesaid applications of Allen. With such pigments, the temperature of heating at 16 hours' calcination time in a muffle furnace may be as high as 850° C. best results being obtained at 550 to 850° C.

It will be understood that these temperatures apply when the product is heated in bulk in a muffle or hearth furnace. With other methods of heating, such as spray drying, heating in fluidized beds or inductive heating with radio frequency or other high frequency electric current, other temperatures can be applicable. The effect of the heating is to reduce the amount of bound water which apparently is chemically combined with the silica. On the other hand, the removal of all of the bound water is undesirable for several reasons.

In the first place, an over-calcined product contains excessive crystalline silica. This is very objectionable from a health standpoint. Moreover, the abrasion resistance of rubber containing the calcined silica herein contemplated is highest when the bound water content thereof is in the range of one mole of water to 14–85 moles of SiO₂. Accordingly, a careful control of the contemplated dehydration is essential.

The exact temperature at which the dehydration is conducted depends upon the type of heating equipment used and the time of drying. Thus, the permissible temperature is higher when spray driers, as distinguished from tray driers or rotary calciners, are used.

The drying may be conducted in one or more stages. That is, the pigment may be dried at 100 to 200° C. to produce a dry powder, as described in the above examples, and then calcined according to this invention. Alternatively, the drying may be conducted in a single operation wherein wet filter cake is introduced into a drier and heated to the desired temperature.

The resulting pigment has the composition $H_2O(SiO_2)_x$, as explained above. It is a finely divided fluffy product having a surface area of 60 to 200 (preferably 75 to 150) square meters per gram and, after standing, normally will pick up a small amount of free water.

The amount of free water which the product contains depends upon the temperature to which the product has been calcined. Where the silica has been calcined above about 800° C., it displays little tendency to pick up free water. In fact, silica produced by direct acidification of sodium silicate tends to lose its ability to pick up much free water when calcined above 600–700° C.

The following examples are illustrative of the calcination or dehydration herein contemplated:

EXAMPLE XI

About 7.5 pounds of finely divided silica prepared as in Example X is placed in a nickel rectangular-shaped pan which is 11.5 inches by 22 inches by 6½ inches deep. The pan is placed in a Hoskins Electric Furnace, 220-volt, which has a heating chamber 13 inches by 33 inches by 8 inches high. This muffle furnace is fitted with an automatic temperature control and calibrated in degrees Fahrenheit. One round vent port 1 inch in diameter is located in the rear of the furnace, and a similar port is located in the center of the furnace door. The muffle, which is fitted with a thermocouple, is heated to the desired calcining temperature after the introduction of the sample. The temperature of the muffle furnace increases about 100° F. per 10 minutes up to the calcining temperature. The time of calcining is approximately 16 hours.

At the end of the calcining period, the heating is discontinued. If the calcining temperature is 600° C. or lower, the sample is removed from the furnace immediately. If the calcining temperature is greater than 600° C., the sample is usually allowed to cool somewhat in the furnace with the furnace door open to avoid discomfort during handling.

Immediately after removal from the furnace, the sample is covered with a nickel lid which fits the nickel calcining pan loosely. The sample is allowed to cool to approximately 100° C., and then usually placed in tinned one-gallon friction top cans. It is thus stored in the absence of atmospheric moisture until the time of compounding.

The following table tabulates the results obtained using two samples of such silica, one containing 1.2 percent by weight of sodium, the other having been treated with acid to reduce the sodium content to 0.5 percent by weight:

TABLE III

| Sample | Starting Sample, Temperature of Calcination (° C.) | Analysis of sample when dried for 24 hours at 105° C. | | | Surface Area (Square meters per gram) | Moisture Regain [1] (24 hours) | Crystallinity, percent |
|---|---|---|---|---|---|---|---|
| | | $SiO_2$ (Percent by weight) | Bound Water (Percent by weight) | Mole Ratio, $SiO_2$ to $H_2O$ | | | |
| Silica No. 1 contains 1.2 percent Na | ----- | 93.0 | 3.55 | 7.8 | ----- | ----- | None |
| | 105 | 92.7 | 3.86 | 7.2 | 126 | 4.2 | None |
| | 200 | 93.43 | 2.81 | 9.5 | 125 | 5.4 | None |
| | 300 | 93.55 | 2.97 | 9.7 | 126 | 5.0 | None |
| | 400 | 94.6 | 1.92 | 15 | 123 | 4.1 | None |
| | 500 | 95.0 | 1.47 | 20 | 119 | 3.2 | None |
| | 600 | 95.1 | 1.28 | 23 | 88 | 1.5 | None |
| | 600 | 95.3 | 1.18 | 25 | 91 | 0.7 | None |
| | 700 | 95.27 | 1.21 | 24 | 52 | 1.6 | 2.4 |
| | 700 | 95.2 | 0.90 | 32 | 43 | 0.7 | None |
| | 800 | 96.1 | 0.34 | 83 | 28 | 0.1 | 100 |
| | 800 | 96.19 | 0.27 | 103 | 6 | 0.3 | None |
| | 900 | ----- | ----- | ----- | ----- | 0 | None |
| Silica No. 2 contains 0.5 percent Na | ----- | 93.19 | 3.89 | 7.2 | ----- | ----- | None |
| | 400 | 94.80 | 2.13 | 14 | 118 | 5.07 | None |
| | 600 | 95.75 | 1.15 | 25 | 101 | 1.94 | None |
| | 700 | 95.7 | 1.20 | 24 | 16 | 0.1 | 8 |
| | 800 | 95.6 | 1.29 | 22 | 18 | 0.1 | 10 |
| | 900 | 96.8 | 3.10 | 29 | 2 | 0.1 | 100 |

[1] Moisture regain done at 50% relative humidity and 73.5° F., 24-hour regain reported.

Rubber compositions containing samples of the product calcined at 400–600° C. have consistently shown better abrasion resistance in test than similar compositions containing the uncalcined product.

EXAMPLE XII

Silica produced according to Example I and dried in a commercial dried at 120–130° C. was calcined as described in Example XII, with the following results:

TABLE IV

| Starting Sample, Temperature of Calcination (° C.) | Analysis of sample when dried for 24 hours at 105° C. | | | Surface Area (Square meters per gram) | Moisture Regain [1] (24 hours) | Crystallinity, percent |
|---|---|---|---|---|---|---|
| | $SiO_2$ (Percent by weight) | Bound Water (Percent by weight) | Mole Ratio, $SiO_2$ to $H_2O$ | | | |
| 105 | 91.4 | 3.96 | 6.2 | ----- | ----- | None |
| 200 | 90.17 | 5.28 | 5.2 | 100 | 7.15 | None |
| 300 | ----- | ----- | ----- | ----- | 8.00 | None |
| 350 | 92.9 | 4.05 | 9.5 | 100 | 7.04 | None |
| 400 | ----- | ----- | ----- | ----- | 6.75 | None |
| 500 | 94.0 | 1.90 | 15 | 95 | 5.64 | None |
| 600 | ----- | ----- | ----- | ----- | 2.81 | None |
| 700 | 95.47 | 0.37 | 77 | ----- | 1.63 | None |
| 800 | 95.11 | 0.69 | 41 | 63 | 0.41 | None |
| 800 | ----- | ----- | ----- | ----- | 0.1 | None |
| 900 | 95.5 | 0.33 | 77 | 43 | 0.45 | None |
| 900 | ----- | ----- | ----- | ----- | 0.1 | None |
| 1,000 | ----- | ----- | ----- | ----- | 0.13 | None |
| 1,000 | ----- | ----- | ----- | 0.84 | ----- | 72 |
| 1,093 | ----- | ----- | ----- | ----- | ----- | 100 |

[1] Moisture regain measured by conditioning sample at 50% relative humidity and 73.5° F. and measuring moisture gained after 24 hours. This water is essentially all "free" water.

Figure 2:
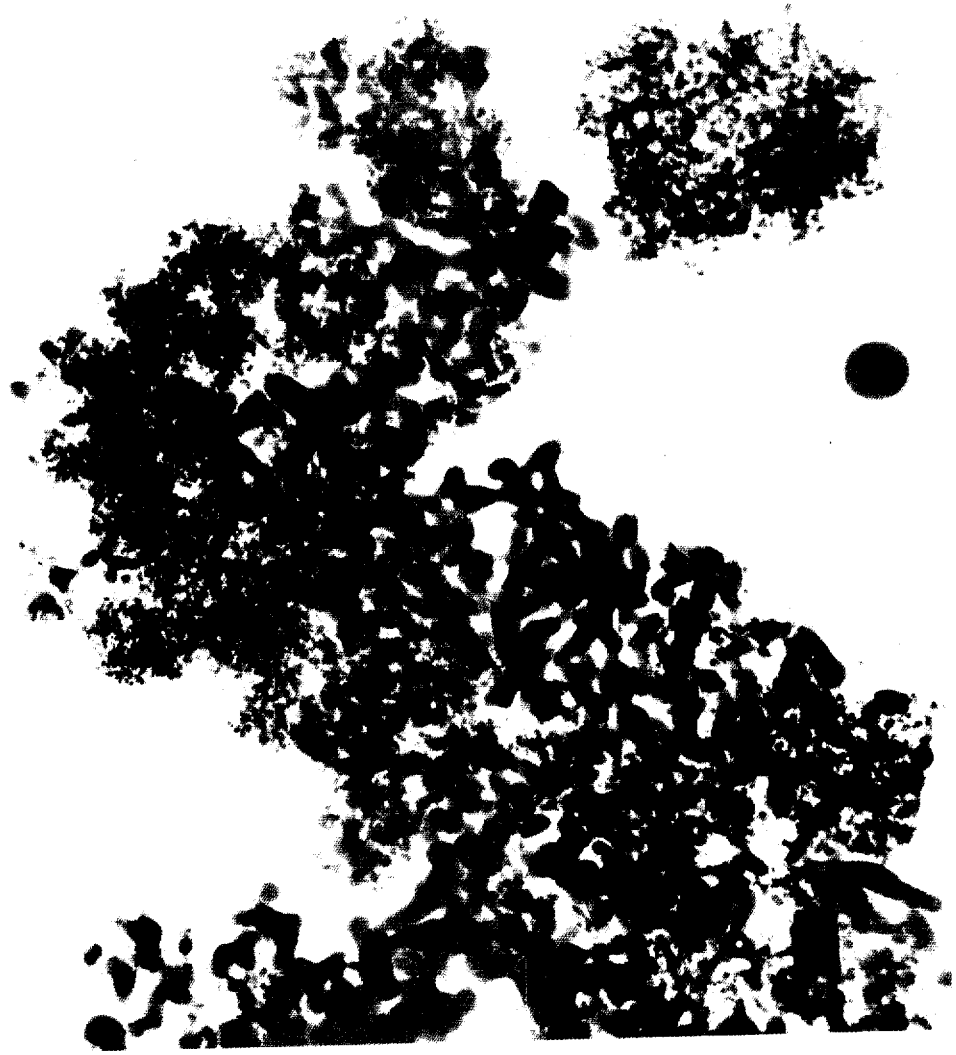

Tires having GR–S tread and containing the silica calcined at 600° C., according to this example, were found to exhibit about 25 percent less wear than similar tires containing the uncalcined silica. Fig. 1 is an electron photomicrograph of the silica produced according to Example I at a magnification of 50,000. Fig. 2 is a similar photomicrograph of the same type of silica calcined at 800° C. according to this Example XII.

EXAMPLE XIII

Ammonium chloride solution containing about 44.8 grams per liter of fixed $NH_3$ as $NH_4Cl$, 73.9 grams per liter of NaCl, and 16.2 grams per liter of free $NH_3$, was used as ammonium chloride solution in this experiment. 2075 gallons of a sodium silicate solution having the composition $(Na_2O)(SiO_2)_{3.36}$ and containing the amount of sodium silicate equivalent to 20 grams per liter of $Na_2O$, and also containing 5.78 grams per liter of sodium chloride, was placed in a 4000-gallon tank equipped with a 25 H. P. turbo agitator. While the temperature of the silicate solution was 25° C., 500 gallons of the ammonium chloride solution was added continuously during agitation over a period of 4 hours.

The resulting product was heated in a still to drive off ammonia and, after the ammonia was driven off, the product was conditioned by holding the resulting slurry above 75° C. for ½ hour. Thereafter, the slurry was filtered and the filter cake dried at 110–125° C.

A quantity of the resulting dried product was calcined at 600° C. as in Example XI. A rubber composition containing this calcined silica was found to have an abrasion loss of 1.8 cubic centimeters per 1600 resolutions, whereas the same rubber composition, when compounded with the uncalcined silica in the same manner, had an abrasion loss of 2.3 cubic centimeters per 1600 revolutions, using a standard method for testing abrasion.

The above described silica compositions are useful reinforcing pigments in various rubber compositions including natural rubber and synthetic rubber compositions including butadiene-1,3-styrene copolymers, butadiene-1,3-acrylonitrile copolymers, butadiene-isobutylene copolymers (butyl rubber) and like synthetic elastomers which are derived from polymerization of butadiene-1,3 2-chlorobutadiene, isoprene, ethylene or the like alone or with other polymerizable materials including styrene, methyl methacrylate, methyl chloroacrylate acrylonitrile, vinyl chloride and there equivalents.

Approximately 5 to 100 parts by weight of silica is used per 100 parts by weight of rubber. Best results are obtained when 40 to 80 parts by weight of silica is used per 100 parts of rubber. The rubber composition usually contains other conventional components such as accelerators and modifying agents. The compositions are prepared and cured according to methods well known in the art.

The following examples are illustrative:

EXAMPLE XIV

Silica prepared as in Example I and silica calcined at 600° C. as in Example XII were compounded into rubber according to the following formula:

| | Parts by weight |
|---|---|
| Natural rubber | 100 |
| Zinc oxide | 5 |
| Sulfur | 3 |
| Phenyl beta naphthylamine | 1 |
| Benzothiazyl disulfide | 0.8 |
| Diortho tolylguanidine | 1.8 |
| Silica | 58.5 |

The above compound was mixed at 315° F. and standard abrasion test specimens were prepared according to standard methods and abrasion resistance of the product was measured. The abrasion resistance for rubber compounded with uncalcined silica was 6.0 cubic centimeters per 1600 revolutions. In contrast the abrasion resistance of rubber reinforced with the calcined silica was only 3.3 cubic centimeters per 1600 revolutions.

Although the present invention has been described with particular reference to the specific details of certain embodiments thereof, it is not intended that such details should be regarded as limitations upon the scope of the invention except insofar as included in the accompanying claims.

What is claimed:

1. Finely divided, precipitated, hydrated, amorphous silica having an average ultimate particle size of 0.015 to 0.05 micron and containing $SiO_2$ and bound water in the proportion corresponding to the formula:

$$H_2O.(SiO_2)_x$$

where $x$ is a number between 14 and 85, said silica having a surface area of 50 to 200 square meters per gram and the crystalline silica content thereof being less than 5 percent by weight, the total $SiO_2$ content thereof being in excess of 80 percent by weight, said silica containing not in excess of about 1 percent $Na_2O$ and having a pH above about 5.

2. Finely divided, precipitated, hydrated, amorphous silica containing $SiO_2$ and bound water in the proportion corresponding to the formula:

$$H_2O.(SiO_2)_x$$

where $x$ is a number between 15 and 50, said silica having a surface area of 50 to 200 square meters per gram and the crystalline silica content thereof being less than 5 percent by weight, the total $SiO_2$ content thereof being in excess of 90 percent by weight, said silica containing calcium in the proportion of one mole of calcium oxide per 10 to 150 moles of $SiO_2$ and having an average ultimate particle size of 0.015 to 0.05 micron, said silica being substantially identical to that produced according to claim 6.

3. Finely divided, precipitated, hydrated, amorphous silica having an average ultimate particle size of 0.015 to 0.05 micron and containing $SiO_2$ and bound water in the proportion corresponding to the formula:

$$H_2O.(SiO_2)_x$$

where $x$ is a number between 15 and 50, said silica having a surface area of 50 to 200 square meters per gram and the crystalline silica content thereof being less than 5 percent by weight, the total $SiO_2$ content thereof being in excess of 90 percent by weight, said silica containing an oxide of a metal of series 3 to 8, group II of the periodic table, in the proportion of one mole of said metal per 10 to 150 moles of $SiO_2$, said silica being substantially identical to that produced according to claim 5.

4. A method of preparing a silica pigment which comprises heating finely divided, precipitated, hydrated, amorphous silica containing $SiO_2$ and bound water in the proportion of 3 to 9 moles of $SiO_2$ per mole of bound water and having a surface area of 50 to 200 square meters per gram, the total $SiO_2$ thereof on the anhydrous basis being in excess of 80 percent by weight, said hydrated silica having an average ultimate particle size of 0.015 to 0.05 micron, at a temperature from about 375° C. to 900° C. until the amount of bound water and silica therein corresponds to the formula:

$$H_2O.(SiO_2)_x$$

where $x$ is a number between 14 and 85, and interrupting the heating before the content of crystalline silica thereof exceeds 5 percent by weight.

5. A method of preparing a silica pigment which comprises heating finely divided, precipitated, hydrated, amorphous silica containing $SiO_2$ and bound water in the proportion of 3 to 9 moles of $SiO_2$ per mole of bound water and having a surface area of 50 to 200 square meters per gram, the total $SiO_2$ content thereof on the anhydrous basis being in excess of 80 percent by weight, said hydrated silica having an average ultimate particle size of 0.015 to 0.05 micron and containing less than 1.75 percent by weight of $Na_2O$, at a temperature from about 375° C. to 900° C., until the amount of bound water and silica therein corresponds to the formula:

$$H_2O.(SiO_2)_x$$

where $x$ is a number between 14 and 85, and interrupting the heating before the content of crystalline silica thereof exceeds 5 percent by weight.

6. A method of preparing a silica pigment which comprises heating finely divided, precipitated, hydrated, amorphous silica containing $SiO_2$ and bound water in the proportion of 3 to 9 moles of $SiO_2$ per mole of bound water and having a surface area of 50 to 200 square meters per gram, the total $SiO_2$ content thereof on the anhydrous basis being in excess of 80 percent by weight, said hydrated silica having an average ultimate particle size of 0.015 to 0.05 micron and containing $CaO$ in the proportion of 1 mole of $CaO$ per 10 to 150 moles of $SiO_2$ and containing less than 2 percent by weight of $Na_2O$, at a temperature above 500° C. but not in excess of 900° C., until the amount of bound water and silica therein corresponds to the formula:

$$H_2O.(SiO_2)_x$$

where $x$ is a number between 14 and 85, and interrupting the heating before the content of crystalline silica thereof exceeds 5 percent by weight.

7. The process of claim 4 wherein the temperature of heating is 500 to 900° C.

8. The process according to claim 4 wherein the hydrated silica subjected to heating is substantially identical to that produced by mixing flowing streams of aqueous sodium silicate solution containing 100 grams of $SiO_2$ as sodium silicate ($Na_2O(SiO_2)_{3.36}$) and of calcium chloride solution containing 100 grams of calcium chloride and 30 to 40 grams of sodium chloride per liter of solution together in the central area of a centrifugal pump at 150° F. while adjusting the rate of flow so that the calcium chloride is approximately 10 percent in excess of the stoichiometric quantity thereof required for reaction and thereby forming finely divided, precipitated calcium silicate having an average ultimate particle size below 0.1 micron, reacting the resulting calcium silicate with sufficient hydrochloric acid solution to reduce the pH of the resulting slurry to 2, thereupon adding to the slurry enough sodium hydroxide to raise the pH of the slurry to 7.5, and recovering the precipitated pigment.

9. A method of preparing a silica pigment which comprises heating finely divided, precipitated, hydrated, amorphous silica containing $SiO_2$ and bound water in the proportion of 3 to 9 moles of $SiO_2$ per mole of bound water, and a total $SiO_2$ content on the anhydrous basis in excess of 80 percent by weight and having a surface area of 50 to 200 square meters per gram, an average ultimate particle size of 0.015 to 0.05 micron, and containing an oxide of a metal of series 3 to 8, group II of the periodic table, in the proportion of 1 mole of said metal per 10 to 150 moles of $SiO_2$, at a temperature of from about 375° C. to but not in excess of 900° C., until the amount of bound water and silica therein corresponds to the formula $H_2O \cdot (SiO_2)_x$, where $x$ is a number between 14 and 85, and interrupting the heating before the content of crystalline silica thereof exceeds 5 percent by weight.

References Cited in the file of this patent

UNITED STATES PATENTS

| | | |
|---|---|---|
| 1,259,806 | Tone | Mar. 19, 1918 |
| 1,270,093 | Arsem | June 18, 1918 |
| 1,347,191 | Thompson et al. | July 20, 1920 |
| 1,819,356 | Church | Aug. 18, 1931 |
| 1,842,394 | Endres | Jan. 26, 1932 |
| 1,903,187 | McClenahn | Mar. 28, 1933 |
| 2,211,510 | Meincke | Aug. 13, 1940 |
| 2,237,374 | Smith | Apr. 8, 1941 |
| 2,496,736 | Maloney | Feb. 7, 1950 |
| 2,649,388 | Wills et al. | Aug. 18, 1953 |
| 2,679,463 | Alexander et al. | May 25, 1954 |
| 2,686,731 | Wainer | Aug. 17, 1954 |

FOREIGN PATENTS

| | | |
|---|---|---|
| 675,341 | Great Britain | July 9, 1952 |

OTHER REFERENCES

Mellor: Comprehensive Treatise on Inorganic and Theoretical Chemistry, Longmans Green & Co., New York, 1925, vol. 6, page 359.

Shapiro et al.: Thermal Aging of Precipitated Silica (Silica Gel); contribution from the School of Chemistry of the University of Minnesota; February 1950.

U. S. DEPARTMENT OF COMMERCE
PATENT OFFICE

CERTIFICATE OF CORRECTION

Patent No. 2,805,956            September 10, 1957

Alphonse Pechukas

It is hereby certified that error appears in the printed specification of the above numbered patent requiring correction and that the said Letters Patent should read as corrected below.

Column 1, line 15, for "reltaes" read -- relates --; column 13, line 35, Example XII, for "dried" read -- drier --; line 72, Example XIII for "fived" read -- fixed --; column 14, line 68, for "resolu-" read -- revolu- --.

Signed and sealed this 22nd day of April 1958.

(SEAL)
Attest:
KARL H. AXLINE
Attesting Officer

ROBERT C. WATSON
Commissioner of Patents